Sept. 15, 1925.

W. T. CARTER

VULCANIZING AIR BAGS

Filed Oct. 29, 1924

1,553,982

INVENTOR.
Walter T. Carter
BY
ATTORNEY.

Patented Sept. 15, 1925.

1,553,982

UNITED STATES PATENT OFFICE.

WALTER T. CARTER, OF LOS ANGELES, CALIFORNIA.

VULCANIZING AIR BAGS.

Application filed October 29, 1924. Serial No. 746,520.

*To all whom it may concern:*

Be it known that I, WALTER T. CARTER, a citizen of the United States, residing at the city of Los Angeles, county of Los Angeles, State of California, have invented new and useful Improvements in Vulcanizing Air Bags, of which the following is a specification.

My invention relates to a device which is inserted in a vehicle tire when the tire is to be repaired, and the object thereof is to provide means to hold the tire in firm contact with the vulcanizing mold while the repair is being made.

In the drawings forming part of this application:

Figure 1:
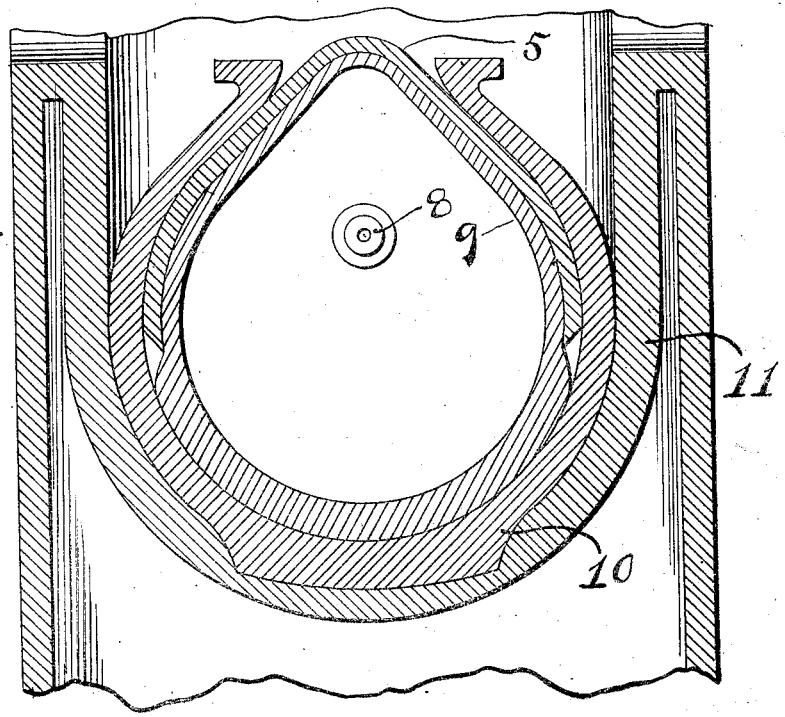
Figure 1 is a side elevation of my device detached.
Figure 2:
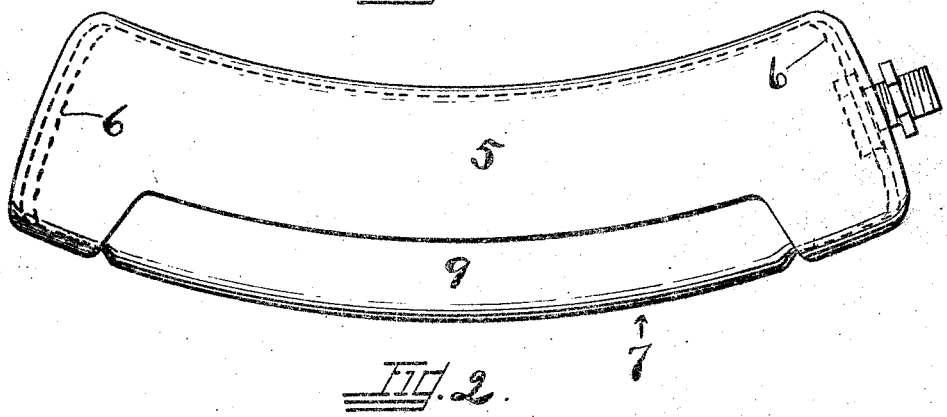
Fig. 2 is an enlarged cross section of the device, and of a tire being repaired, and of a fragment of the mold.

Referring to the drawings, my device consists of an outer jacket 5 of flexible material, preferably heavy fabric and rubber and similar to the outer casings of tires, which preferably has the ends reinforced as shown in dotted lines 6 in Fig. 1. This jacket has an elongated opening therein as shown at 7 and a port or opening in one end for air valve stem 8, which stem is attached to the air bag 9, which bag is positioned within jacket 5 when the device is in use. I prefer to reinforce the part of the wall of bag 9 which registers with the opening in jacket 5 by a strip of canvas and rubber. The jacket and bag are of a length to fit in a tire when positioned in a mold of usual size. In some cases I may make my device long enough to reach around the whole tire but in such case it would be necessary to have an air bag for each size of casing.

By this construction I can make the air bag of more elastic material than where no outer jacket is used, as the jacket prevents strain on the bag at the tire opening. After the repair is made to tire 10 my device is put in place therein and the whole is put in mold 11. The bag is then inflated in the usual manner and the repair is vulcanized, after which the parts are disassembled in the usual manner.

While I have shown the air valve stem attached to one end of bag 9, it is obvious it could be attached at other points between the tire beads when positioned for use.

Having described my invention, I claim:

1. A vulcanizing device comprising an outer jacket having a longitudinal opening in one side thereof; an air bag adapted to be mounted in said jacket; and means attached to said bag to enable it to be filled with air.

2. A vulcanizing device comprising an outer jacket having reinforced ends with a port in one end, said jacket having a longitudinal opening in one side thereof; an air bag adapted to be mounted in said jacket, said bag being reinforced at the part that registers with the opening in the jacket; an air valve stem attached to one end of said bag, said stem being adapted to project through the port in the end of the casing.

In witness that I claim the foregoing I have hereunto subscribed my name this 21st day of October, 1924.

WALTER T. CARTER.